(12) United States Patent
Song

(10) Patent No.: US 10,684,060 B2
(45) Date of Patent: Jun. 16, 2020

(54) MOUNTING STRUCTURE OF COMPRESSOR OF REFRIGERATOR AND MOUNTING METHOD THEREOF

(71) Applicant: LG Electronics Inc., Seoul (KR)

(72) Inventor: Sang Hoon Song, Seoul (KR)

(73) Assignee: LG Electronics Inc., Seoul (KR)

(*) Notice: Subject to any disclaimer, the term of this patent is extended or adjusted under 35 U.S.C. 154(b) by 122 days.

(21) Appl. No.: 15/793,238

(22) Filed: Oct. 25, 2017

(65) Prior Publication Data

US 2018/0112908 A1  Apr. 26, 2018

(30) Foreign Application Priority Data

Oct. 26, 2016  (KR) .................. 10-2016-0139959

(51) Int. Cl.
*F25D 23/00* (2006.01)
*F04B 53/22* (2006.01)
(Continued)

(52) U.S. Cl.
CPC .......... *F25D 23/006* (2013.01); *F01C 21/007* (2013.01); *F04B 53/22* (2013.01);
(Continued)

(58) Field of Classification Search
CPC ...... F25D 23/006; F25D 19/00; F25D 23/003; F25D 21/14; F01C 21/007; F04B 53/22;
(Continued)

(56) References Cited

U.S. PATENT DOCUMENTS 3,785,167 A * 1/1974 Sahs .................. F25D 23/006
                                                    62/296
4,490,990 A * 1/1985 Chastine ............ F25D 21/14
                                                    62/279
(Continued)

FOREIGN PATENT DOCUMENTS

CN  101509717  8/2009
CN  201560916  8/2010
(Continued)

OTHER PUBLICATIONS

Extended European Search Report in European Application No. 17197678.0, dated Mar. 9, 2018, 9 pages.

*Primary Examiner* — Frantz F Jules
*Assistant Examiner* — Martha Tadesse
(74) *Attorney, Agent, or Firm* — Fish & Richardson P.C.

(57) ABSTRACT

A mounting structure of a compressor for a refrigerator that includes: a base on which the compressor is mounted; a compressor that includes: a main body, and an ear mount that is coupled to the main body and that is configured to mount on the base; a post that is coupled to the base, that extends upwardly from the base, and that is configured to couple to the ear mount; a vibration absorber that is interposed between the ear mount and the base and that is configured to absorb vibration of the compressor; a stopper that is configured to restrict the ear mount from departing from the post; and an inner ear mount that includes a hole that is open toward a first direction, wherein the compressor is inserted into the machine room in the first direction, is disclosed.

17 Claims, 11 Drawing Sheets

(51) Int. Cl.
*F01C 21/00* (2006.01)
*F16F 15/08* (2006.01)
*F25B 31/00* (2006.01)

(52) U.S. Cl.
CPC ............... *F16F 15/08* (2013.01); *F25B 31/00* (2013.01); *F25B 2500/13* (2013.01)

(58) Field of Classification Search
CPC ......... F04B 39/128; F16F 15/08; F16F 1/373; F25B 2500/13; F25B 31/00
See application file for complete search history.

(56) References Cited

U.S. PATENT DOCUMENTS

| | | | | |
|---|---|---|---|---|
| 4,497,183 A * | 2/1985 | Gelbard | ............... | F25B 31/006 62/279 |
| 4,539,737 A * | 9/1985 | Kerpers | ............... | F25D 23/006 248/671 |
| 4,920,696 A * | 5/1990 | Mawby | ............... | F25D 23/006 248/674 |
| 5,117,523 A * | 6/1992 | Jacobus | ............... | F25D 23/006 62/259.1 |
| 5,221,192 A * | 6/1993 | Heflin | ............... | F16F 1/373 248/638 |
| 5,402,654 A * | 4/1995 | Rudick | ............... | A47F 3/0408 62/448 |
| 5,711,162 A * | 1/1998 | Wolanin | ............... | F16M 11/42 29/513 |
| 5,913,892 A * | 6/1999 | Kwon | ............... | F16F 15/046 62/296 |
| 6,354,558 B1 * | 3/2002 | Li | ............... | F16F 1/3732 248/615 |
| 6,912,865 B2 * | 7/2005 | Seo | ............... | F16F 1/3732 181/207 |
| 6,948,324 B2 * | 9/2005 | Jin | ............... | F25D 19/02 62/298 |
| 2003/0230104 A1 * | 12/2003 | Morse | ............... | F25D 19/00 62/277 |
| 2005/0056041 A1 * | 3/2005 | Jin | ............... | F25D 19/02 62/302 |
| 2005/0160760 A1 * | 7/2005 | Chae | ............... | F25B 39/04 62/454 |
| 2009/0169387 A1 * | 7/2009 | Yoo | ............... | F04D 29/668 416/190 |
| 2011/0154676 A1 * | 6/2011 | Castiglione | ............... | D06F 58/206 34/86 |
| 2012/0076673 A1 * | 3/2012 | Thomas | ............... | F16B 33/002 417/313 |
| 2015/0275898 A1 * | 10/2015 | Ahire | ............... | F04C 23/008 418/55.2 |

FOREIGN PATENT DOCUMENTS

| | | | | |
|---|---|---|---|---|
| JP | 07293447 A | * | 11/1995 | |
| JP | 2000-346332 | * | 4/2000 | |
| JP | 2000111203 | | 4/2000 | |
| JP | 2000111203 A | * | 4/2000 | |
| JP | 2000111203 A | | 4/2000 | |
| JP | 2001280242 | | 10/2001 | |
| JP | 2002081377 A | * | 3/2002 | ........... F04D 23/008 |
| JP | 2002081377 A | | 3/2002 | |
| KR | 19990019291 A | | 3/1999 | |
| KR | 2002045849 Y1 | | 12/2001 | |
| KR | 20030049536 A | * | 6/2003 | |
| KR | 20040055992 A | * | 6/2004 | |
| KR | 20070025474 A | * | 3/2007 | ........... F25D 23/006 |
| KR | 2009070695 A | | 7/2009 | |
| KR | 20090070695 A | * | 7/2009 | |

\* cited by examiner 20  12  30

MOUNTING STRUCTURE OF COMPRESSOR OF REFRIGERATOR AND MOUNTING METHOD THEREOF

CROSS-REFERENCE TO RELATED APPLICATION

This application claims priority to and the benefit of Korean Patent Application No. 10-2016-0139959, filed on Oct. 26, 2016, the disclosure of which is incorporated herein by reference in its entirety.

TECHNICAL FIELD

The present disclosure relates to a compressor for a refrigerator.

BACKGROUND

In order to keep a refrigerator cool, a thermodynamic refrigeration cycle is applied thereto, and a process of compressing a refrigerant in a gas-phase state is inevitably required in such a cycle. Since a compressor requires rotational power, a motor structure including a stator and a rotor is generally embedded in the compressor.

Rotation of the motor causes noise and also causes vibration. Although the noise of the motor itself can be blocked or limited to some extent, another noise caused by the vibration is not easy to be blocked and is very disruptive to a user. Since the refrigerator is usually installed indoors, this noise can cause considerable inconvenience in a residential environment close to a kitchen and a living space.

Therefore, the compressor should not be installed by simply fixing the compressor in a machine room of the refrigerator, and the compressor has to be fixed in the machine room using a vibration absorbing structure which functions as a vibration absorbing damper.

FIG. 1 is a plan view illustrating a conventional compressor. Conventionally, in order to fix a compressor on a base, posts are mounted on the base, which constitutes a floor of a machine room, in a perpendicular direction, an ear mount 22 of a compressor 20 is fitted onto the post while a vibration absorber formed of rubber or the like is mounted on a lower side of the post, and the compressor 20 is disposed on the vibration absorber. That is, the ear mount 22 of the compressor 20 is restricted in all directions by the post and is disposed on the base with the vibration absorber interposed therebetween.

The conventional compressor 20 has a shape which is slightly higher in a vertical direction in consideration of an area thereof in all directions, and the ear mount 22 is positioned at a lower level than a lower end of a main body 21 of the compressor. Since the compressor 20 has a structure in which the ear mount 22 is formed to protrude outward from the main body in a top view, an operator can sufficiently view the ear mount 22 in a side view as well as in the top view while he is fixing the compressor.

However, in this type of compressor, a height thereof in the vertical direction is large, and a mounting height of the compressor in the vertical direction is also large because the ear mount is positioned lower than the lower end of the main body. Therefore, in the above-described type of conventional compressor, the compressor cannot be mounted in a machine room unless a machine room has a sufficient height. Particularly, when the compressor-mounting process is performed after the base of the machine room has been installed at the cabinet through the insulator foaming process, it is inconvenient to mount the compressor from the rear of the refrigerator to the machine room.

That is, since the shape of the conventional compressor and a mounting method of the compressor require a considerable level of the height of the machine room to be secured, an occupied volume of the machine room of an entire volume of the refrigerator needs to be increased, and thus it is difficult to secure a storage space of the cabinet.

SUMMARY

In general, one innovative aspect of the subject matter described in this specification can be implemented in a mounting structure of a compressor for a refrigerator, wherein the compressor is mounted in a machine room of the refrigerator through the mounting structure, the mounting structure comprising: a base on which the compressor is mounted; a compressor that includes: a main body, and an ear mount that is coupled to the main body and that is configured to mount on the base; a post that is coupled to the base, that extends upwardly from the base, and that is configured to couple to the ear mount; a vibration absorber that is interposed between the ear mount and the base and that is configured to absorb vibration of the compressor; a stopper that is mounted on an upper portion of the post and that is configured to restrict the ear mount from departing from the post; and an inner ear mount that is located inside the machine room and that includes a hole that is open toward a first direction, wherein the compressor is inserted into the machine room in the first direction.

The foregoing and other implementations can each optionally include one or more of the following features, alone or in combination. In particular, one implementation includes all the following features in combination. The hole includes: a through portion that is configured to accommodate the post, and an opening that is open toward the through portion. The opening has a first width that enables the post to be inserted into the opening in a second direction, and wherein the through portion has a second width that is larger than the first width. The mounting structure further includes: a guide surface that is located adjacent to the opening and that includes a first portion and a second portion, wherein the first portion is closer to the opening than the second portion, and wherein a first opening width of the guide surface with respect to the first portion is smaller than a second opening width of the guide surface with respect to the second portion. The mounting structure further includes: an outer ear mount that is adjacent to an entrance of the machine room with respect to a center of the compressor and that includes a through hole into which the post is inserted. The through hole has a closed-circle shape. A first distance between a surface of the ear mount to which the main body is coupled and the base is larger than a second distance between a first end of the main body and the base. The vibration absorber is configured to surround an external surface of the post and is mounted on the post. The machine room includes a first space and a second space, and wherein the first space is closer to an entrance of the machine room through which the compressor is inserted than the second space. The inner ear mount is located in the second space of the machine room.

Another innovative aspect of the subject matter described in this specification can be implemented in a method for mounting a compressor on a machine room of a refrigerator, the method comprising: fitting, respectively, a plurality of vibration absorbers to a plurality of posts that are mounted on a base; fitting a stopper to a first post of the plurality of posts; coupling an inner ear mount of the compressor to a portion of the first post, the portion of the first post being located between the stopper and the vibration absorber, wherein the inner ear mount includes a hole comprising an opening and a through portion, and wherein the first post is inserted into the through portion through the opening; coupling an outer ear mount of the compressor to a second post of the plurality of posts; and coupling a stopper to a portion of the second post, the portion of the second post being exposed upwardly from the base.

The foregoing and other implementations can each optionally include one or more of the following features, alone or in combination. In particular, one implementation includes all the following features in combination. Coupling the inner ear mount to the portion of the first post includes: installing a guide jig that is configured to guide insertion of the compressor to the first post before the first post is inserted into the through portion, and guiding, by the guide jig, the compressor to be inserted into the machine room. In a state in which ear mounts including the inner ear mount and outer ear mount are coupled to the posts, mounting the compressor on the base after mounting the base on a machine room of the refrigerator, and wherein mounting the base on the machine room of the refrigerator includes assembling the base with a cabinet of the refrigerator and foaming an insulator. In a state in which ear mounts including the inner ear mount and outer ear mount are coupled to the posts, mounting the compressor on the base after mounting a heat exchanger on the base. The machine room includes a first space and a second space, and wherein the first space is closer to an entrance of the machine room through which the compressor is inserted than the second space. The inner ear mount and the first post are located in the second space of the machine room. The outer ear mount and the second post are located in the first space of the machine room.

Another innovative aspect of the subject matter described in this specification can be implemented in a guide jig that is configured to guide a compressor to mount the compressor on a refrigerator through a mounting structure of the compressor, the guide jig comprising: a body; a guide surface that extends in parallel to the body in a first direction and that is configured to guide inner ear mounts of the compressor; and a post contact portion of the guide surface, the post contact portion being configured to (i) contact a first post of a plurality of posts that are coupled to a base of the mounting structure and (ii) arrange the guide jig and the first post.

The foregoing and other implementations can each optionally include one or more of the following features, alone or in combination. In particular, one implementation includes all the following features in combination. The guide jig further includes: a handle configured to enable a user to hold the guide jig. The post contact portion includes a groove that is configured to accommodate the first post.

The subject matter described in this specification can be implemented in particular examples so as to realize one or more of the following advantages. Comparing to a conventional mounting structure of a compressor, a mounting structure of a compressor is compact so that a mounting height of the compressor is small. As a result, a height of a machine room in which the compressor is mounted can be reduced and the compressor can be easily installed in the machine room. Moreover, a refrigerator can have more storage space by reducing a height of a machine room. Furthermore, a guide jig which allows a mounting operation of the compressor to be performed more conveniently.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure may not be limited to the implementations described below, but may be implemented in various other forms.

Example Compressor

Figure 1:
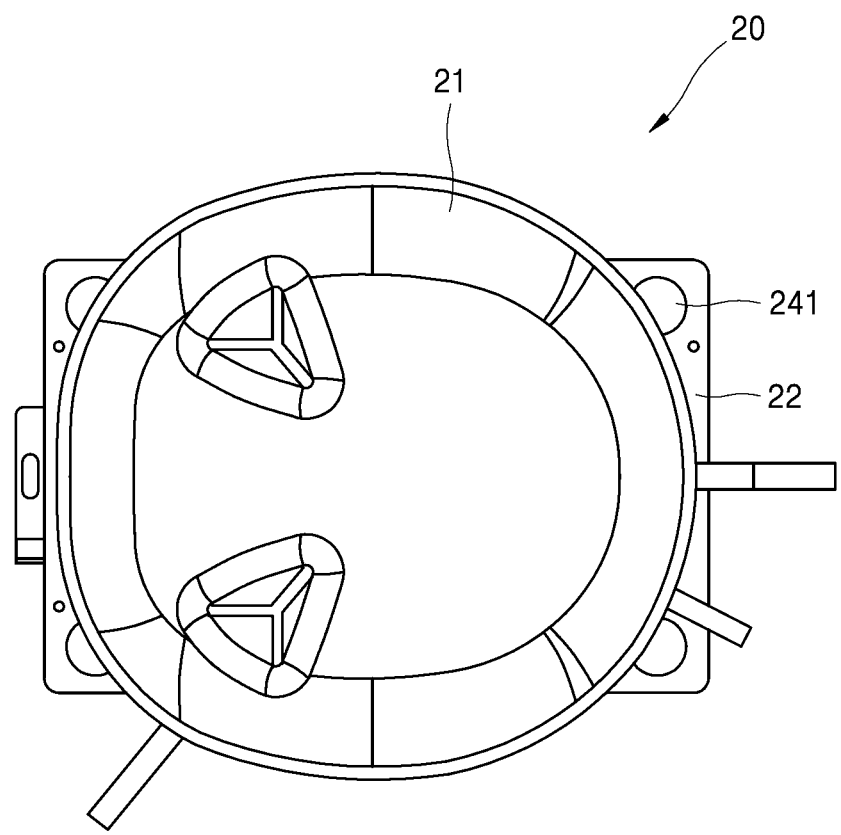
FIG. 1 is a diagram illustrating a conventional compressor.
Figure 2:
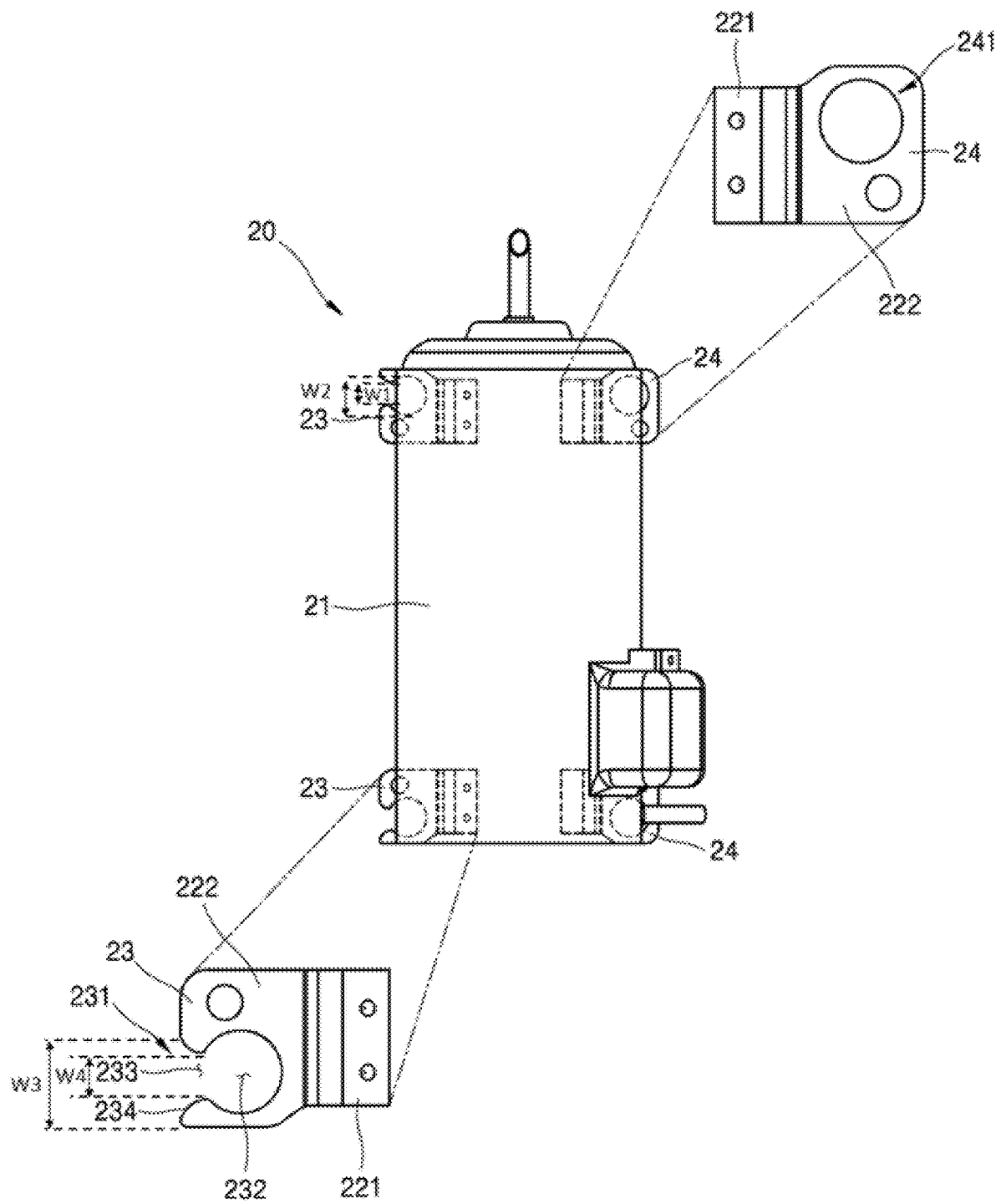
FIGS. 2 and 3 are diagrams illustrating an example compressor.
Figure 3:
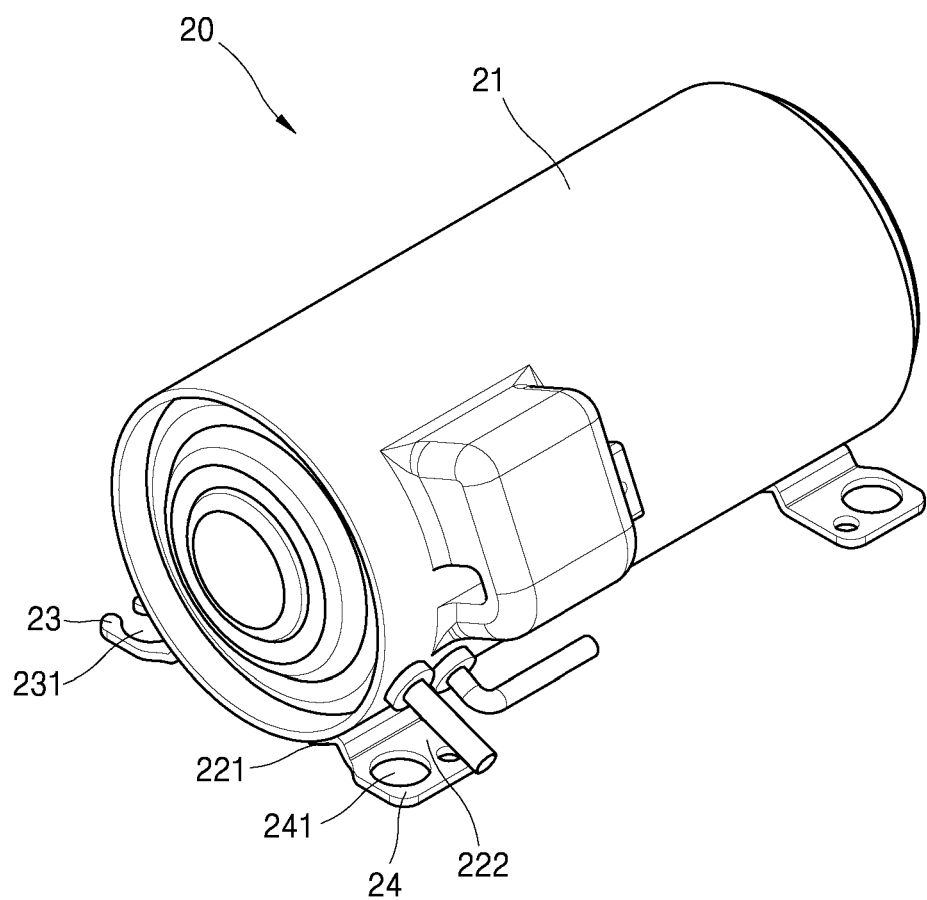
Figure 4:
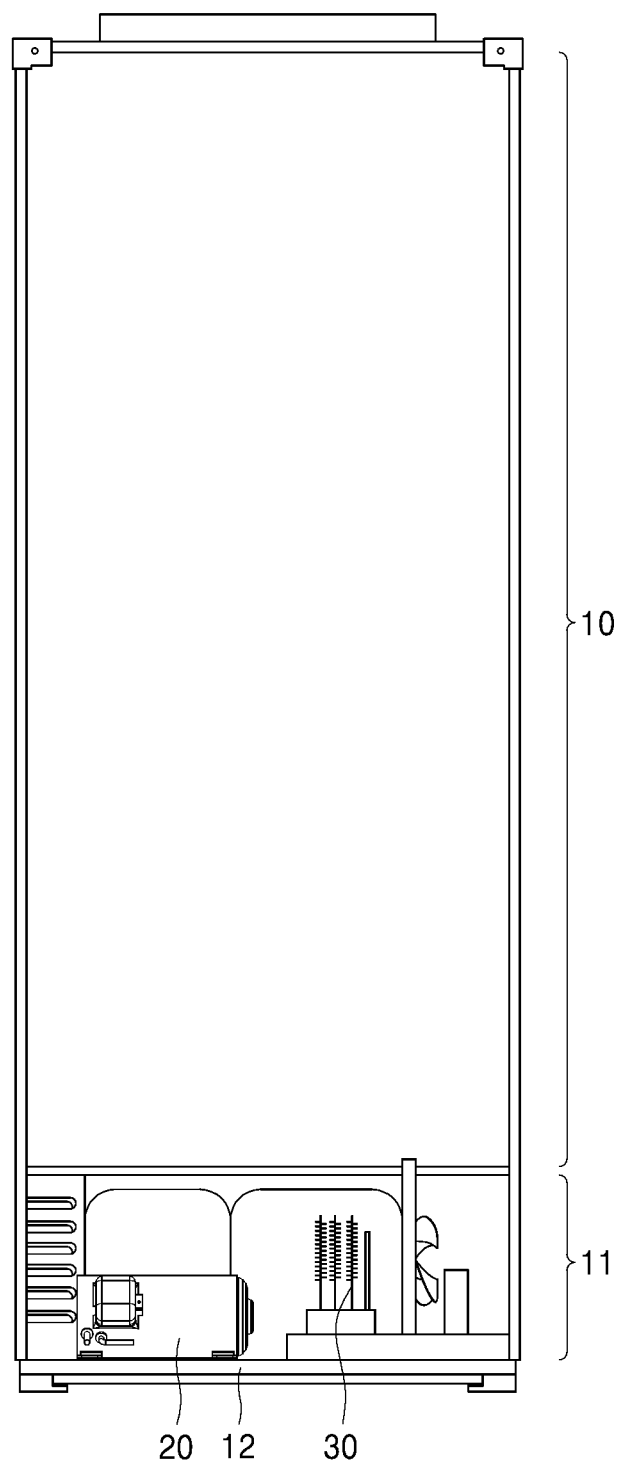
FIG. 4 is a diagram illustrating an example refrigerator.
Figure 5:
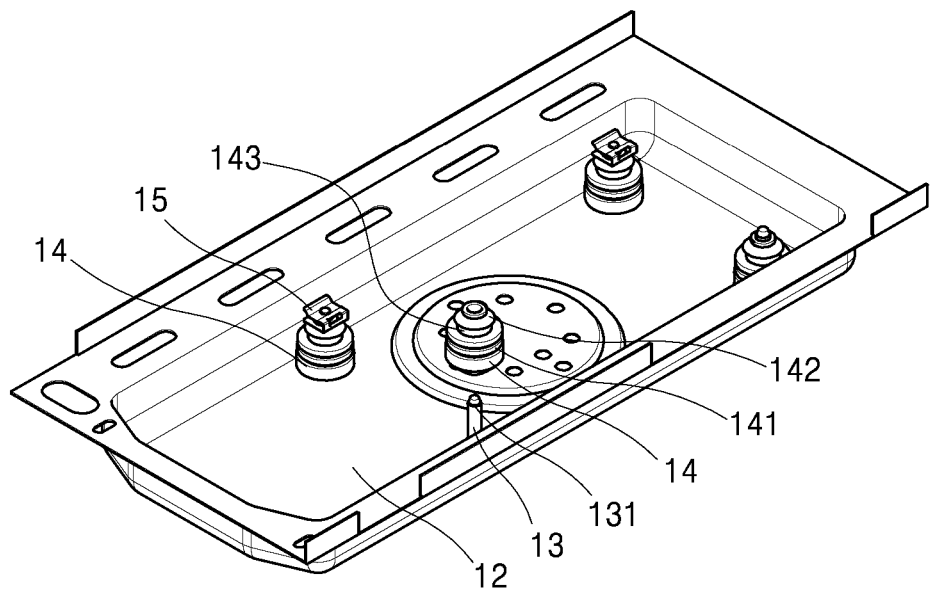
FIG. 5 is a diagram illustrating an example compressor that is not mounted on a base of a machine room of a refrigerator.
Figure 6:
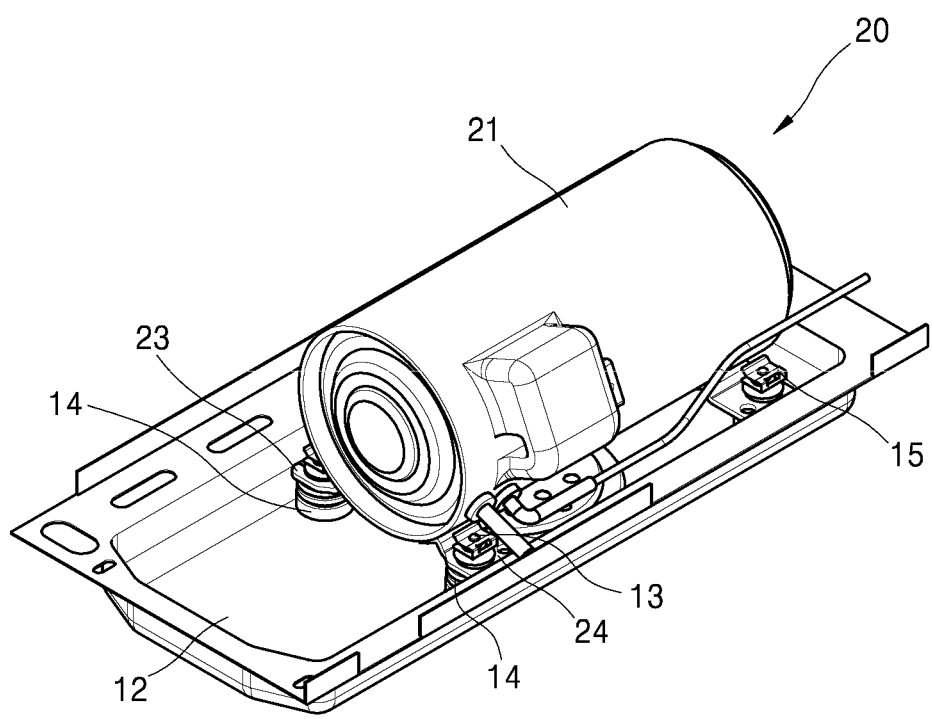
FIG. 6 is a diagram illustrating an example compressor that is mounted on a base of a machine room of a refrigerator.

FIGS. 2 and 3 illustrate an example compressor. FIG. 4 illustrates an example refrigerator. FIG. 5 illustrates an example compressor that is not mounted on a base of a machine room of a refrigerator. FIG. 6 illustrates an example compressor that is mounted on a base of a machine room of a refrigerator.

A compressor 20 includes a main body 21 in a cylindrical shape, and ear mounts 23 and 24 are mounted around four corners of the main body in a state of being laid down. The ear mounts are divided into inner ear mounts 23, each disposed at a position away from an opening of a machine room 11 which is open in a rearward direction of the refrigerator, i.e., disposed further inside the machine room, and outer ear mounts 24, each disposed close to the opening of the machine room 11. The ear mount is a plate material which includes a junction surface 221 having a surface corresponding to an outer circumferential surface, which is in a cylindrical shape, of the main body 21 of the compressor and being coupled to the outer circumferential surface and a mounting surface 222 configured to extend outward from the junction surface and having a flat shape, wherein the mounting surface is disposed to be parallel to the ground or a bottom of the machine room of the refrigerator, i.e., a base 12.

In the illustrated compressor, the mounting surface 222 extends in a direction receding from a central axis of the main body 21 in the cylindrical shape, and the above-described ear mount is provided with a structure which may be coupled to a post mounted on the base 12. First, the inner ear mount 23 will be described. The inner ear mount 23 is provided with a hole, i.e., an open hole 231, which is open in a direction receding from the central axis of the main body (this corresponds to a mounting direction or inserting direction of the compressor, which will be described below). Specifically, the open hole 231 has an opening 233 and a through portion 232.

The opening 233 has a slightly greater opening width than a width of a post 13, which will be described below. The through portion 232 is provided with a shape which communicates with an inside of the opening 233, has a greater width than a width of the opening, and has a shape corresponding to a cross section of the post. Both the cross section of the post and the shape of the through portion may have circular shapes. Further, a guide surface 234, which has a shape in which an opening width thereof is gradually increased toward the outside, is formed outside the opening 233.

The post 13 provided on the base 12 is coupled to the open hole 231 by the post 13 being guided by the guide surface 234 to be moved toward the opening 233, passed through the opening 233, and then accommodated in the through portion 232. Accordingly, the inner ear mount 23 approaches the post 13 in a lateral direction and is coupled to the post. In addition, since the open hole 231 also includes the through portion 232, the open hole 231 may certainly be coupled to the post in the vertical direction.

Then, the outer ear mount 24 will be described. The outer ear mount 24 is provided with a through hole 241 having a shape correspond to and slightly greater than the shape of the cross section of the post. The through hole 241 also has a circular shape to correspond to a cross section of a post in a circular shape. Accordingly, the outer ear mount 24 may be coupled to the post in the vertical direction.

Although the outer ear mount 24 has a structure in a through hole in which all lateral sides are blocked in the implementation of the present disclosure, there is no problem in restricting a position of the compressor even when a hole has a shape which is open in a different direction from an open direction of the open hole 231 of the inner ear mount 23, e.g., in a direction opposite the open direction of the open hole 231 of the inner ear mount 23.

For example, when a direction in front of the refrigerator refers to a forward direction and a direction toward an entrance of the machine room refers to the rearward direction, the inner ear mount provided with the open hole 231 may restrict the position of the compressor in lateral and rearward directions, and the outer ear mount provided with the through hole 241 may restrict the position of the compressor in the lateral direction and in both the forward and rearward directions. Alternatively, it is noteworthy that, when the outer ear mount also includes an open hole in a shape which is open in the rearward direction to restrict the position in the lateral and forward directions, the inner and outer ear mounts may cooperate to restrict the position of the compressor in all directions.

In some implementations, referring to FIG. 2, the ear mounts 23 and 24 barely protrude outward from the main body 21 in a top view. Such a shape is for reducing a width of a space required for mounting the compressor in the machine room when the compressor is mounted therein. Since the open hole 231 or the through hole 241 of the ear mount is barely exposed to the outside of the main body 21, as shown in FIG. 2, the main body 21 and the ear mounts 23 and 24 are able to be formed compactly as described above.

Figure 10:
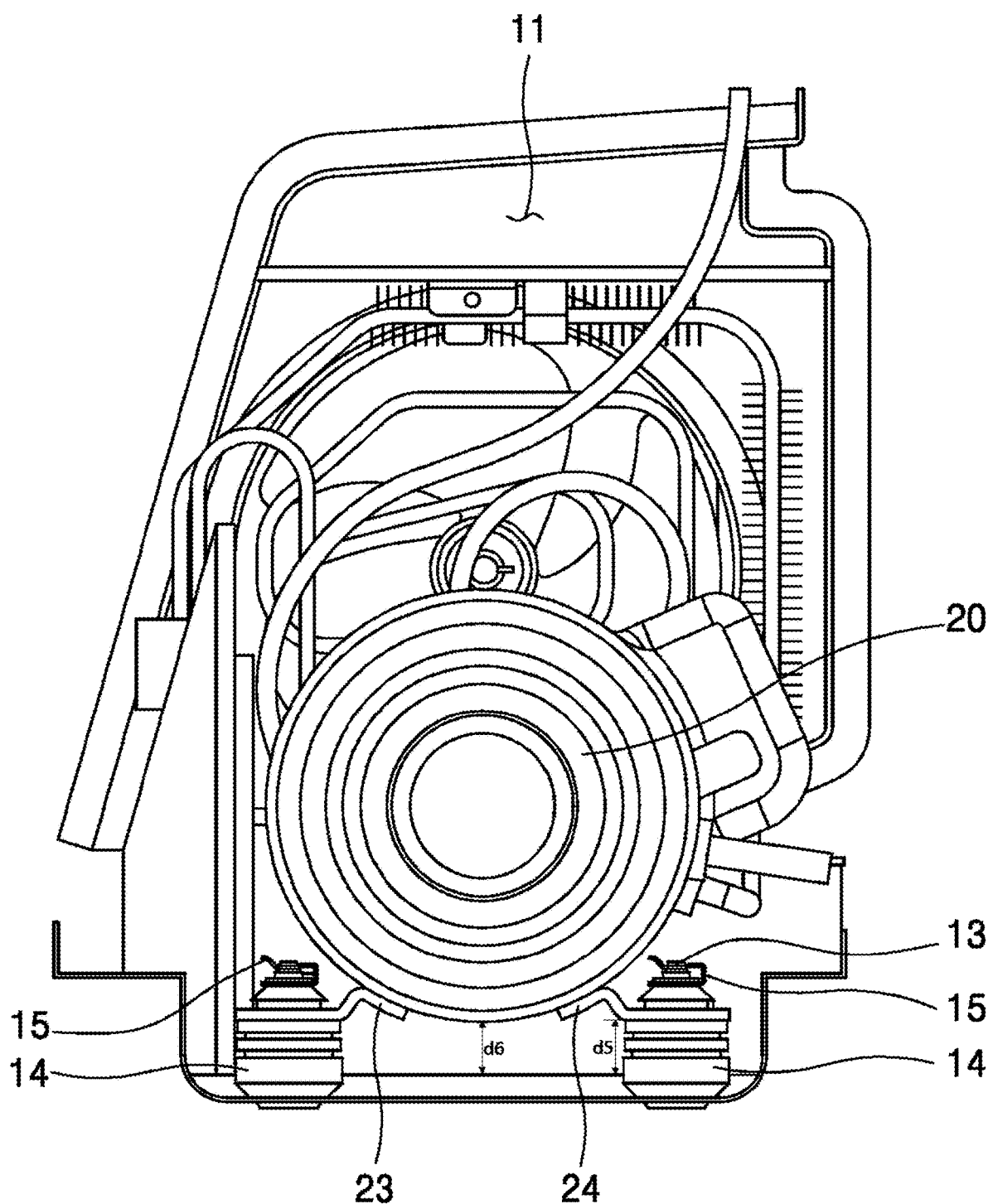

Further, referring to FIG. 3 or 10, when a lower end of the main body 21 of the compressor is positioned at a level similar to the mounting surface of each of the ear mounts 23 and 24 or when the mounting surface of each of the ear mounts 23 and 24 is positioned at a slightly higher level than the lower end of the main body of the compressor, a height of a mounting space occupied by the compressor mounted in the machine room can be minimized. Since the mounting surface 222 of the ear mount is mounted on the base 12 with a vibration absorber 14, which will be described below, interposed therebetween, the main body of the compressor is not in contact with the base even when the lower end of the main body of the compressor is positioned at a slightly lower level than the mounting surface of the ear mount.

That is, when the outward protrusion of the ear mounts 23 and 24 from the main body 21 of the compressor in a top view is minimized, as shown in FIG. 2, and the mounting surface of the ear mount is positioned close to or at a slightly higher level than the lower end of the main body, as shown in FIG. 3 or 10, a volume occupied by the compressor and a volume occupied by the compressor mounted in the machine room can be minimized.

However, when the compressor is designed to have such a compact structure, it is difficult to perform a coupling and assembly process of the ear mount and the post 13 of the base. That is, when a compact compressor is designed, visibility and a workspace with respect to an operation location need to be secured. Therefore, there is a tradeoff between such required working conditions and an assembling process of the compressor in the above-described shape in that a storage space of the cabinet 10 is additionally secured by reducing an overall volume of the machine room 11.

Since the inner ear mount 23 is provided with the open hole 231 in consideration of such a tradeoff, the present disclosure has a technical feature characterized by allowing a process of coupling the ear mount and the post to be smoothly performed even when visibility and a workspace of an operator are insufficiently secured The compressor 20 is fixed on the base 12, wherein the mounting surface of each of the ear mounts 23 and 24 of the compressor 20 is disposed on the base 12 with the vibration absorber 14 formed of an elastic material such as rubber or the like and interposed therebetween. Also, an inner circumferential surface of the open hole 231 and an inner circumferential surface of the through hole 241 are externally fitted onto the post 13 such that the vibration absorber 14 is interposed therebetween. Further, the stopper 15 is coupled to a part of the post which is located at a higher level than the ear mount coupled to the post so that the ear mount can be prevented from falling upwardly from the post. The vibration absorber 14 may certainly be disposed between an upper surface of the ear mount and a lower surface of the stopper to prevent the upper surface of the ear mount and the lower surface of the stopper from coming into contact with each other.

A heat exchanger 30, which is a condenser, a fan configured to generate an air flow, and the compressor 20 are mounted in a space of the machine room 11 defined by the cabinet 10 and the base 12. In order to mount the compressor 20 therein, posts 13 are mounted on the base 12 at locations corresponding to the holes 231 and 241 of the ear mounts. In some implementations, as shown in FIG. 5, four posts are mounted on corners which are in a rectangular form. The post 13 may have a peg or pin shape and may be formed to extend from an upper surface of the base 12 in a perpendicular direction, and corners of an upper end thereof are slightly rounded and tapered so that an inserting operation of the post into the hole 241 is smoothly performed. Further, a groove 131, which is formed right under an upper end of the post 13 and into which the stopper 15 is fixedly inserted, is provided in a ring shape formed along an outer circumferential surface of the post 13, and thus the groove 131 restricts a location of the stopper and provides a coupling force for the stopper.

The vibration absorber 14 formed of a rubber material is externally fitted onto the post 13. A hole is formed in a center of the vibration absorber 14 in the vertical direction, and the post 13 is inserted into the hole. A lower portion of the vibration absorber 14, which is referred to as a lower structure 141, is formed to be thick, the ear mount is disposed on the thick lower portion of the vibration absorber, and the thick lower structure 141 supports a weight of the compressor 20 and absorbs vibration of the compressor 20. Further, an outwardly protruding structure, which is referred to as an upper structure 142, is provided on an upper portion of the vibration absorber 14 in a radial direction, and thus an upper surface of the ear mount is prevented from coming into direct contact with the stopper. Further, a connector 143 located between the lower structure 141 and the upper structure 142 faces the inner circumferential surface of the through hole 241 or the open hole 231 and prevents the post 13 from coming into direct contact with the holes 231 and 241.

Referring to FIG. 5, which illustrates a state before the compressor is disposed on the post 13, both the vibration absorber 14 and the stopper 15 are mounted on two inner posts among the four posts 13, and the vibration absorber is only fitted onto each of two outer posts among the four posts 13.

In the above state, each of the two inner posts is inserted into the open hole 231 of the inner ear mount 23 in the lateral direction such that the open hole 231 is positioned between the vibration absorber 14 and the stopper 15 of the inner post, then each of the two outer posts is inserted into the through hole 241 of the outer ear mount 24 such that the through hole 241 is moved therein from above in a downward direction and located immediately above the vibration absorber 14 of the outer post, and then the stopper 15 is coupled to an end portion of the post, which protrudes upward from the outer ear mount, so that the compressor is completely mounted on the base, as shown in FIG. 6.

Example Method for Mounting a Compressor

Hereinafter, a mounting method of the above-described mounting structure of a compressor of a refrigerator will be described in detail.

Figure 7:
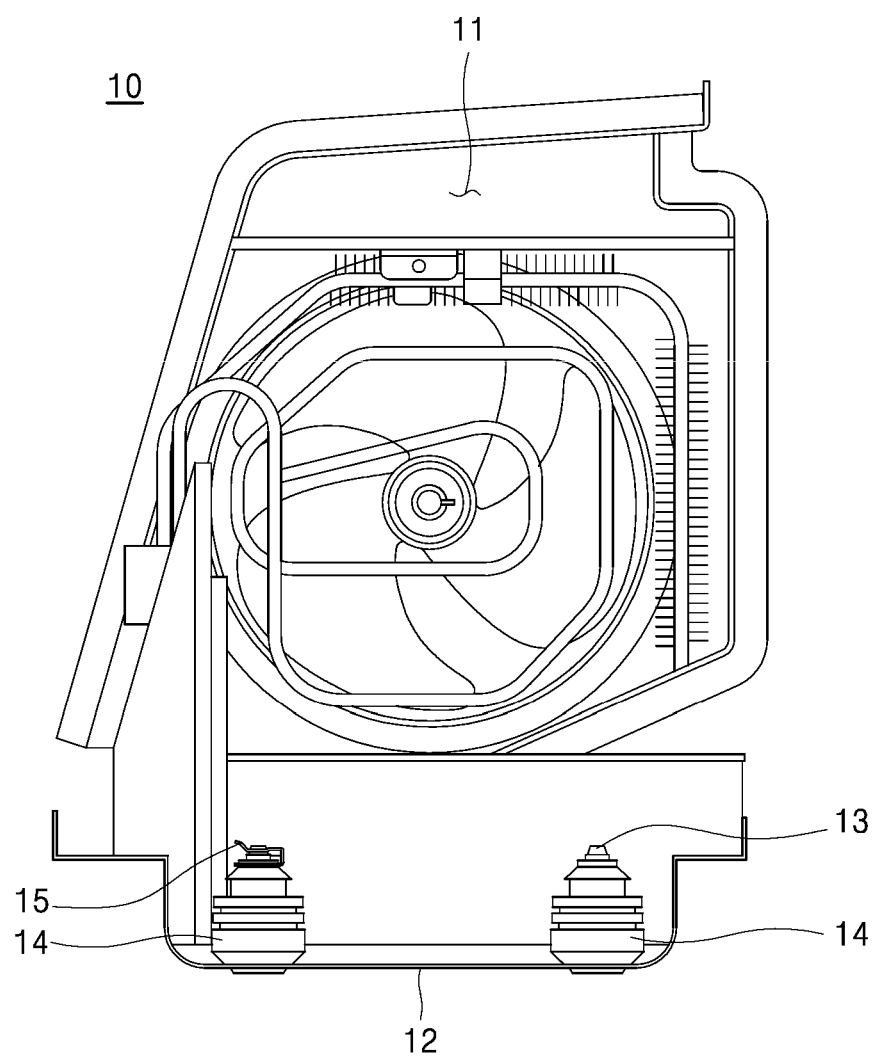
FIGS. 7 to 10 are diagrams illustrating an example method for mounting a compressor on a base of a machine room of a refrigerator.
Figure 8:
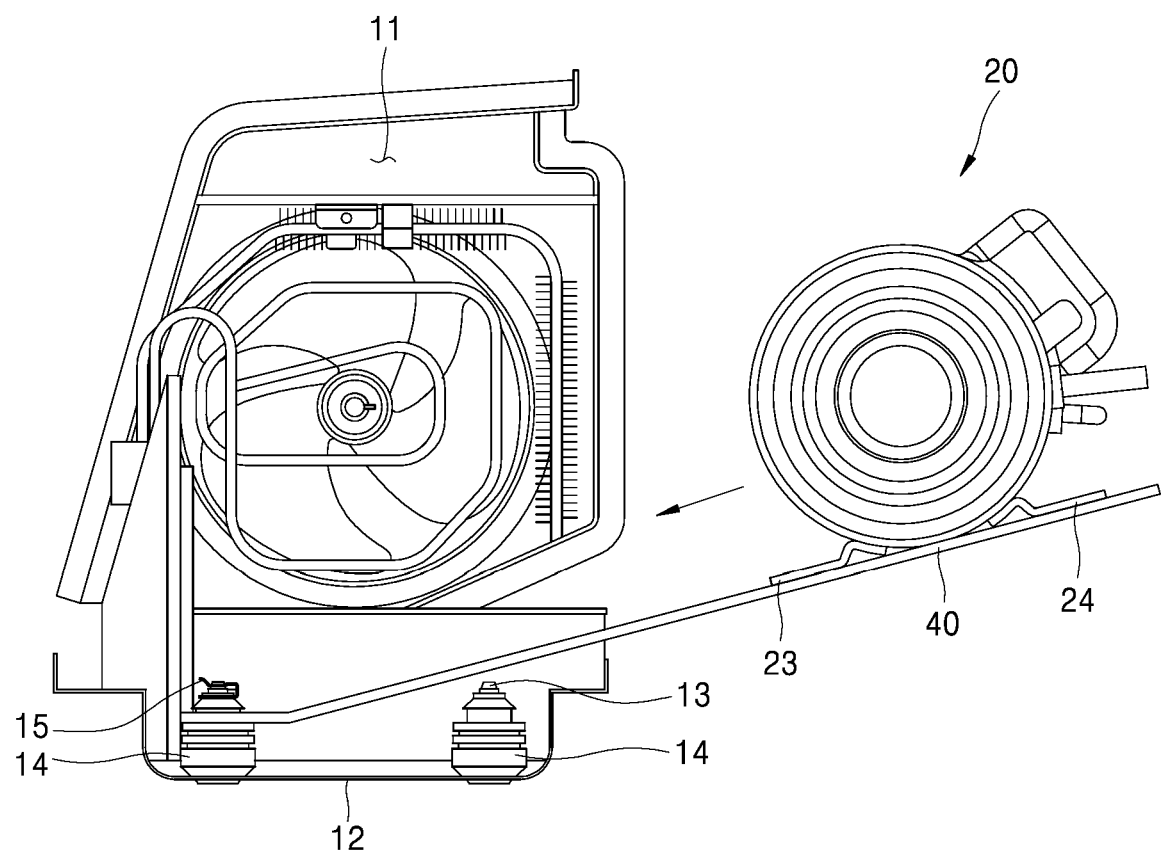
Figure 9:
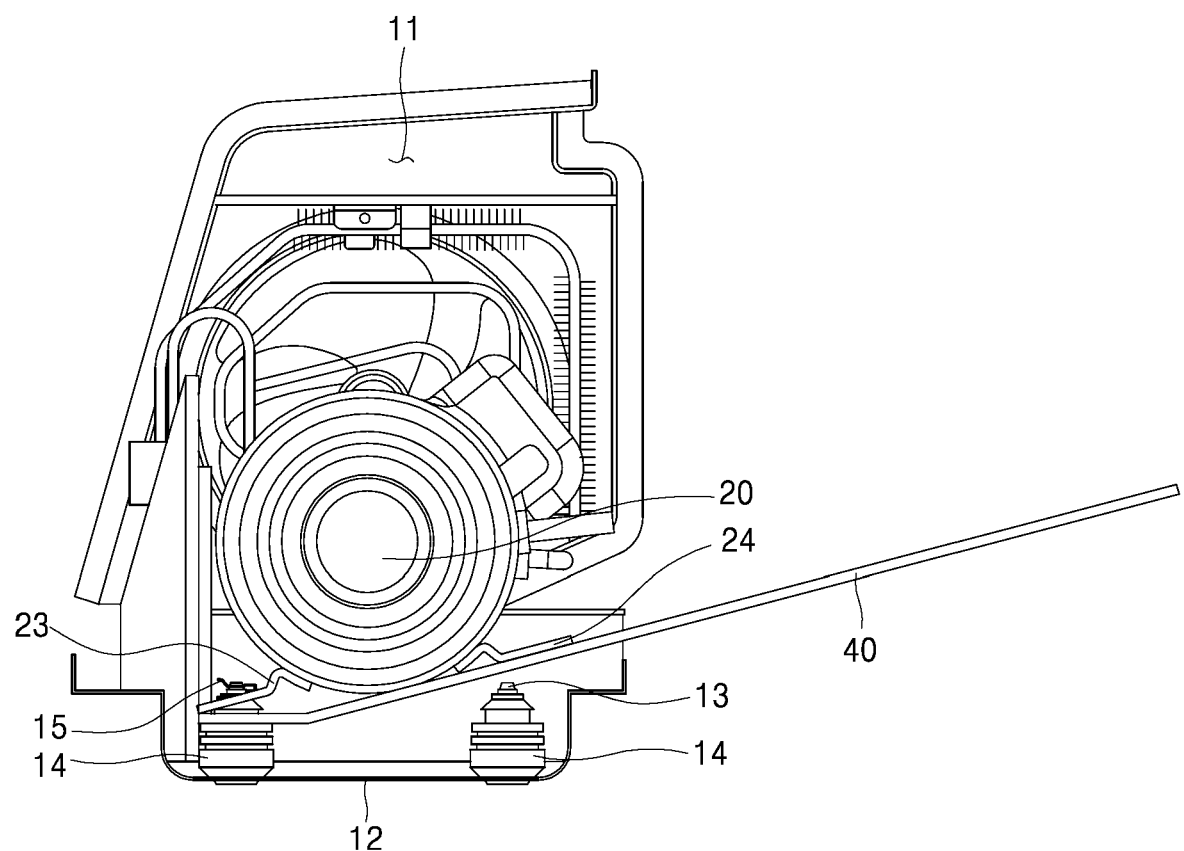

FIGS. 7 to 10 illustrate an example method for mounting a compressor on a base of a machine room of a refrigerator. FIG. 7 illustrates an example compressor that is not mounted. FIG. 8 illustrates an example method of installing a guide jig on an inner post and inserting a compressor into a machine room of a refrigerator. FIG. 9 illustrates an example compressor that is fully inserted into a machine room of a refrigerator along a guide jig. FIG. 10 illustrates an example guide jig that is removed and an example outer ear mount that is fixed after a compressor is completely inserted into a machine room of a refrigerator.

In some implementations, the mounting process of a compressor is performed after the machine room 11 is partitioned by the cabinet 10 and the base 12 by foaming an insulator into the gap between an inner housing and outer housing of the cabinet in a state in which the cabinet 10 is assembled with the base 12. Alternatively, in a case in which the compressor 20 is mounted on the base 12 before the machine room is set, because a workspace is sufficient, assembly is possible by fitting four ear mounts 23 and 24 of the compressor onto the four posts 13 from above in a downward direction in a state in which the vibration absorber 14 is fitted onto each of the four posts 13 provided on the base and fitting the stopper 15 to the groove 131 which is formed on upper part of the four posts 13 and located over each of the four ear mounts 23 and 24.

The machine room 11 is disposed in a shape which is open in the rearward direction of the refrigerator after the base 12 is mounted on a main body of the refrigerator. In this state, first, the heat exchanger 30 is mounted in the machine room 11, as shown in FIG. 7. The heat exchanger is mounted in the machine room as a tray drip form. Further, the vibration absorber 14 is externally fitted onto each of the four posts 13 mounted on an upper surface of the base 12. Then, the stopper 15 is mounted on each of two posts 13 located away from an entrance of the machine room 11, i.e., located further inside the machine room 11. When the stopper is not mounted on each of the two posts located further inside the machine room in advance, a coupling operation of the stopper is difficult because an operator may not see a corresponding post which is hidden by a main body of the compressor when the ear mount is coupled to the corresponding post. Accordingly, the present disclosure provides a fitting method of the ear mount of the compressor in a lateral direction after fastening the stopper first, as will be described below.

As described above, after the stopper is mounted on the inner post, a guide jig 40 is temporarily installed over the two inner posts as shown in FIG. 8. A front end portion of the guide jig 40 is located at a location at which the post is inserted into the open hole 231 of the inner ear mount of the compressor. Since the inner ear mount is externally fitted onto the post 13 and the open hole 231 of the inner ear mount is located between the vibration absorber (more specifically, the lower structure 141) and the stopper 15 of the post 13, the front end portion of the guide jig is disposed on the lower structure 141.

In the above state, the compressor 20 is disposed on the guide jig 40 and the compressor is pushed into the machine room while being guided by the guide jig. At this time, the ear mounts 23 and 24 are disposed on a guide surface 42 (see FIG. 11) of the guide jig and guided in the forward direction in a state in which locations of the ear mounts are arranged.

When the compressor is completely pushed into the machine room, as shown in FIG. 9, the open hole 231 of the inner ear mount 23 is located between the stopper 15 and the lower structure 141 of the vibration absorber 14. In a state in which the inner ear mount and the inner post are coupled in the machine room, when the guide jig 40 is removed in a state in which the outer ear mount of the compressor is lifted and the compressor is pushed, the front end portion of the guide jig is removed from the lower structure 141 of the vibration absorber and the inner ear mount 23 is seated on the vibration absorber 14.

Since the above-described state is a state in which the inner post and the inner ear mount are arranged in advance, the rear of the compressor from which the outer ear mount is lifted is slowly moved downward, and then the outer post is externally inserted into the through hole 241 of the outer ear mount 24. At this time, the stopper 15 is mounted on an upper end of the outer post so that the compressor 20 is completely mounted thereon, as shown in FIG. 10.

Example of Guide Jig

Figure 11:
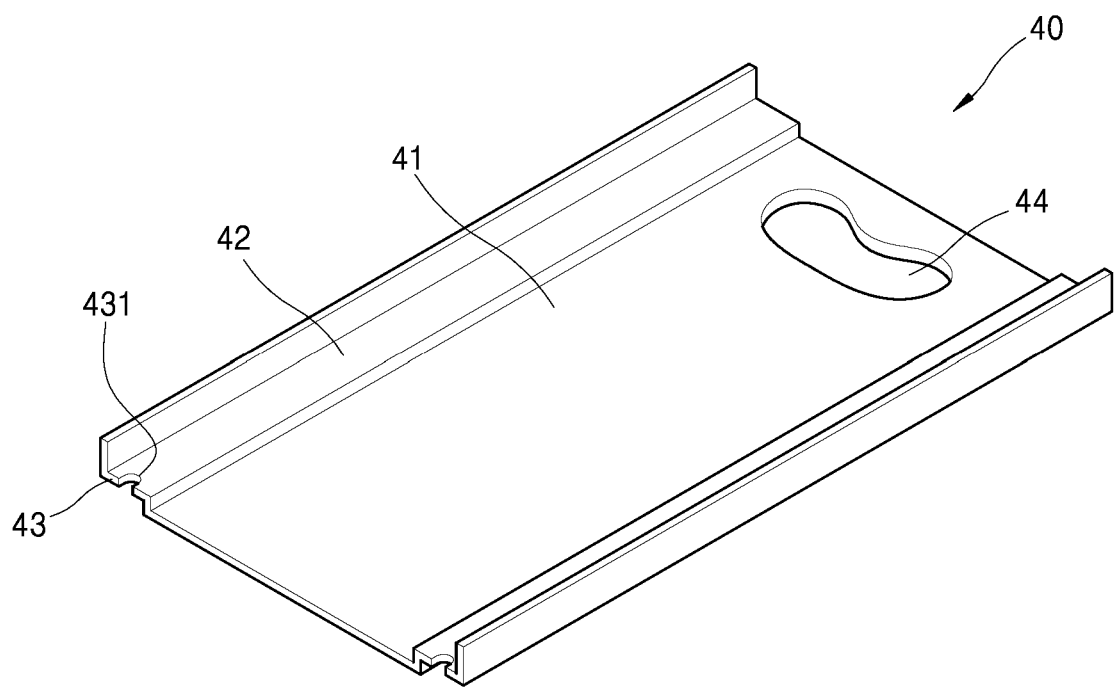
FIG. 11 is a diagram illustrating an example guide jig.

FIG. 11 illustrates an example guide jig. The guide jig used in the above mounting process of a compressor guides the compressor to be inserted into a machine room in a state in which the open hole 231 of the inner ear mount and the post 13, which are in front of the compressor in an inserting direction when the compressor is inserted into the machine room, are arranged.

The guide jig 40 includes a body 41 configured to define an overall exterior and maintain stiffness, and a guide surface 42 configured to extend from both sides of the body 41 in a longitudinal direction, i.e., in the inserting direction of a compressor. Lower portions of both ends of the compressor 20 or the ear mounts of both ends of the compressor are disposed on the guide surface 42.

Further, a front end portion of the guide surface 42 is a portion 43 in contact with the inner post, and an accommodating groove 431 into which the inner post is temporarily inserted for correctly arranging the inner post and the inner ear mount may be provided. Accordingly, a user may insert and couple the guide jig 40 into the machine room at right position by fitting the inner post inside the machine room into the accommodating groove 431 located at the front end portion of the guide surface 42, and may easily insert the compressor into the machine room. When the accommodating groove 431 and the post are temporarily coupled, the location of the guide jig is fixed by mutual interference of the two structures, and a subsequent operation may be easily performed.

Further, a backend portion of the guide jig is provided with a handle 44 which will be griped by an operator. The handle is preferably provided in a hole shape so as not to interfere with operation. Particularly, the handle may be gripped by a user when the compressor is left in the machine room and only the guide jig is removed after the compressor is disposed on the guide jig and completely inserted into the machine room.

In some implementations, since a height of a machine room can be minimized and a compressor can be easily installed even when a workspace and visibility are difficult to secure, a space in a refrigerator can be secured, and a manufacturing process of a refrigerator and an after-service process can be easily performed.

While the present disclosure has been particularly shown and described with reference to exemplary implementations thereof, it should be understood that the scope of the disclosure is not limited to the disclosed implementations and drawings, and it should be obvious that various modifications may be made by a person skilled in the art within the scope of the technical idea of the present disclosure. Although the implementations of the present disclosure have been described above and effects according to the configuration of the present disclosure have been explicitly described, it should be understood that predictable effects should also be recognized by the configuration.

What is claimed is:

1. A mounting structure of a compressor for a refrigerator, wherein the compressor comprises a main body having a cylindrical shape and is mounted in a machine room of the refrigerator through the mounting structure, the mounting structure comprising:
    a base on which the compressor is mounted, wherein the machine room defines an entrance configured to receive the compressor therethrough, a first space through which the compressor passes in a first direction to be inserted into the machine room, and a second space configured to accommodate a portion of the compressor, the first space being defined closer to the entrance than the second space;
    a plurality of ear mounts that are coupled to an outer circumferential surface of the main body and that are mounted on the base, the plurality of ear mounts comprising:
        an inner ear mount that is located in the second space of the machine room and that defines a hole that is open in the first direction, and
        an outer ear mount that is located in the first space of the machine room and that defines a through hole, wherein at least a portion of the hole of the inner ear mount and a portion of the through hole of the outer ear mount are covered by the main body;
    a plurality of posts that are coupled to the base, that extend upwardly from the base, and that are inserted into the hole or the through hole to thereby couple to the plurality of ear mounts, respectively;
    a vibration absorber that is interposed between at least one of the plurality of ear mounts and the base and that is configured to absorb vibration of the compressor; and
    a stopper that is mounted on an upper portion of at least one of the plurality of posts and that is configured to restrict the ear mount from departing from the post.

2. The mounting structure of claim 1, wherein the hole includes:
    a through portion that is configured to accommodate a post among the plurality of posts, and
    an opening that is open toward the through portion.

3. The mounting structure of claim 2, wherein the opening is configured to receive the post therethrough and has a first width that enables the post to be inserted into the opening in a second direction, and
    wherein the through portion is configured to accommodate the post received through the opening and has a second width that is larger than the first width.

4. The mounting structure of claim 2, wherein the inner ear mount has:
    a guide surface that faces the opening and that defines a width of the opening that increases as the guide surface extends outward through the opening.

5. The mounting structure of claim 1, wherein the through hole has a closed-circle shape.

6. The mounting structure of claim 1, wherein a first distance between the hole or through hole and the base is larger than a second distance between a lowest end of the main body and the base.

7. The mounting structure of claim 1, wherein the vibration absorber surrounds an external surface of the at least one of the plurality of posts and is mounted on the at least one of the plurality of posts.

8. A method for mounting a compressor on a machine room of a refrigerator, the method comprising:
    mounting a plurality of posts on a base;
    fitting, respectively, a plurality of vibration absorbers to the plurality of posts;
    fitting a stopper to a first post of the plurality of posts;
    based on fitting the stopper to the first post, coupling an inner ear mount of the compressor to a portion of the first post, the portion of the first post being located between the stopper and one of the plurality of vibration absorbers, wherein the inner ear mount includes a hole comprising an opening and a through portion, and wherein the first post is inserted into the through portion through the opening;
    based on coupling the inner ear mount to the first post, coupling an outer ear mount of the compressor to a second post of the plurality of posts; and
    coupling another stopper to a portion of the second post, the portion of the second post being exposed upwardly from the outer ear mount of the compressor that is coupled to the second post.

9. The method of claim 8, wherein coupling the inner ear mount to the portion of the first post includes:
    installing a guide jig that is configured to guide insertion of the compressor to the first post before the first post is inserted into the through portion, and guiding, by the guide jig, the compressor to be inserted into the machine room.

10. The method of claim 8, wherein mounting the compressor on the base is performed after mounting the base on the machine room of the refrigerator, and wherein mounting the base on the machine room of the refrigerator includes assembling the base with a cabinet of the refrigerator and foaming an insulator.

11. The method of claim 8, wherein mounting the compressor on the base is performed after mounting a heat exchanger on the base.

12. The method of claim 8, wherein the machine room includes a first space and a second space, and wherein the first space is closer to an entrance of the machine room through which the compressor is inserted than the second space.

13. The method of claim 12, wherein the inner ear mount and the first post are located in the second space of the machine room.

14. The method of claim 12, wherein the outer ear mount and the second post are located in the first space of the machine room.

15. The mounting structure of claim 1, wherein the inner ear mount and the outer ear mount are spaced apart from each other and arranged along the outer circumferential surface of the main body.

16. The mounting structure of claim 1, wherein the outer ear mount is located closer to the entrance of the machine room than the inner ear mount.

17. The mounting structure of claim 1, wherein the inner ear mount and the outer ear mount are spaced apart from the base in a vertical direction and extend downward from the outer circumferential surface of the main body.

* * * * *